United States Patent
Huet

[11] 3,729,155
[45] Apr. 24, 1973

[54] MOULDED WING FLAP

[75] Inventor: Roger Huet, Grenoble, France

[73] Assignee: Merlin Gerin, Societe Anonyme, Grenoble, France

[22] Filed: Dec. 14, 1970

[21] Appl. No.: 97,533

[30] Foreign Application Priority Data

Dec. 22, 1969 France..................6944535

[52] U.S. Cl...................244/123
[51] Int. Cl...................B64c 3/24
[58] Field of Search.............244/123, 124, 40, 244/41, 42, 117; 249/176; 164/369; 161/69, 68

[56] References Cited

UNITED STATES PATENTS 3,028,292 4/1962 Hinds..................244/123 X
3,249,327 5/1966 Smith, Jr...............244/123

Primary Examiner—Milton Buchler
Assistant Examiner—Carl A. Rutledge
Attorney—Stevens, Davis, Miller & Mosher

[57] ABSTRACT

A moulded light alloy cast wing flap having thin external walls and internal partition walls forming a monolithic cast structure to withstand shrinkage stresses.

3 Claims, 1 Drawing Figure

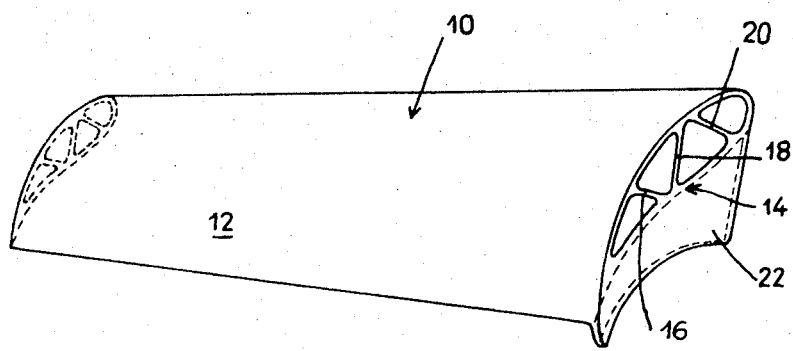

MOULDED WING FLAP

This invention relates to a light alloy or ultra-light alloy hollow thin-walled casting, the dimensions and external shape of which must comply with very strict tolerances and for which little, if any, further machining is needed. The invention relates more particularly to the design of the internal shaping of a wing flap with a view to the external shaping having very close dimensional tolerances — i.e., having a maximum tolerance of ± 0.2 mm in relation to the theoretical profile based on aerodynamic calculations.

The flaps or slats with which the invention is particularly concerned are hollow ailerons which are fitted to supersonic aircraft between the aerobrake panels and the trailing edges of the actual wing, the purpose of the flaps being to avoid the gap associated with the opening of the brake panels.

At supersonic speeds it is essential that the external profiles of flaps or fins should lie within very close tolerances; further, such items must be hollow to be light enough for use in aircraft.

The conventional ways of making such items are either to machine a forged or swaged light alloy or ultra-light alloy blank, a very costly step in the light of the curved profiles of the item, or to shape up sheet metal whose ends are welded near the trailing edges, rigidity being achieved by an injection of expandable resin into the hollow interior of the item.

One proposal to obviate these complicated manufacturing processes is to use precision casting processes, which have the further advantage of providing very high metallurgical properties rivalling those obtained by the other two techniques mentioned; unfortunately, it has so far proved impossible to achieve the hoped-for results. The inner shapes normally designed by aircraft engineers are hollow shapes which substantially follow the outside contour of the article, metal thickness being substantially constant. It is found that castings with this kind of shape suffer from distortion in the undersurface shapes and to a lesser extent in the top surface shapes due to shrinkage being inhibited by the presence of the rigid and substantially incompressible core used in the mould cavity.

It is an object of the present invention to obviate this disadvantage and to enable a hollow thin-walled article to be cast with its outside profile true to dimensions without the need for further machining.

A hollow moulding according to the invention comprises internal ribbing formed by cast partition walls arranged spatially to balance the shrinkage stresses produced during the cooling of the casting.

The internal ribbing suitably divides the hollow interior of the flap or fin into non-deformable triangles which, when seen from the side of the article, form a proper framework which helps to balance shrinkage stresses and thus to obviate the distortions occurring in similar articles cast without internal ribbing.

The weight increase occasioned by the ribbing is relatively reduced, for it can be partly offset by a reduction in wall thickness, if absolutely necessary, and the fixing members at the ends can be cast integrally with the flaps, thus obviating embeddings and helping to restore the balance of the weights which are added on one side and reduced on the other.

The finished products have a compact and highly rigid box structure, and the resulting increased mechanical strength improves the dimensional stability of the profiles, which usually experience alternate bending stresses and the fatigue limits of which are therefore improved.

Ribbing shapes may vary according to the cross-sections, dimensions and loading of the articles concerned. In small articles the problems of inhibited shrinkages can be solved more readily than in large articles and so the ribbing can be lightened and take the form just of one or more intermediate partitions or ribs. On the other hand, if transverse and longitudinal dimensions are considerable, a proportionally more developed form of ribbing, possibly taking the form of a real cellular structure, may be necessary to ensure the required dimensional tolerances.

Other advantages and characteristics of the invention will be disclosed by the following description of an exemplary non-limiting embodiment of the invention shown in the accompanying drawing, the single FIGURE of which is a perspective view of an internally ribbed wing flap according to the invention.

Referring to the drawing, a wing flap or slat 10 has a thin-walled, e.g. 2 to 2.5 mm thick, upper surface 12 and bottom surface 14 of light or ultra-light alloy cast by any known precision casting process. Narrow longitudinal walls or partitions 16, 18, 20 extend through the hollow interior of the member 10 and are joined to the surfaces 12 and 14 to form an anti-distorting internal framework in the member 10. The internal skeleton or framework 16, 18, 20 and the surfaces 12, 14 are cast integrally in an appropriate mould cavity. As will be readily apparent, this framework helps to balance the shrinkage stresses arising during the manufacture of the member 10 and therefore contributes to the mechanical strength of the member 10. A securing end member 22 cast integrally with the member 10 is contrived at the side edge thereof. Advantageously, the partitions 16, 18, 20 are arranged to form triangulated systems having great longitudinal and transverse rigidity, for instance, so as to bound triangular cross-section spaces as shown; clearly, however, any other construction is possible. The ribs of the example in the drawing are continuous longitudinal partitions but may equally take the form of intermittent strut-like partitions providing a rigid connection between the top surface and bottom surface.

What is claimed is:

1. In a substantially hollow unitary cast air foil of ultra-light alloy having a longitudinal direction and an upper and a lower face, the improvement which comprises a plurality of cast partition walls extending between said upper and said lower face substantially the whole longitudinal length of said air foil, said partition walls being cast integral with said upper and said lower face.

2. An air foil according to claim 1, wherein said partition walls comprise dihedral web portions.

3. An air foil according to claim 1, wherein said partition walls comprise zigzaggedly disposed stiffening web portions.

* * * * *